(12) United States Patent
Jung et al.

(10) Patent No.: US 9,631,315 B2
(45) Date of Patent: Apr. 25, 2017

(54) CONTROLLING METHOD FOR CLOTHES DRYER

(75) Inventors: Kiwook Jung, Changwon-si (KR); Junseok Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 524 days.

(21) Appl. No.: 14/007,217

(22) PCT Filed: Mar. 27, 2012

(86) PCT No.: PCT/KR2012/002221
§ 371 (c)(1),
(2), (4) Date: Sep. 24, 2013

(87) PCT Pub. No.: WO2012/134148
PCT Pub. Date: Oct. 4, 2012

(65) Prior Publication Data
US 2014/0041249 A1 Feb. 13, 2014

(51) Int. Cl.
*D06F 58/28* (2006.01)
*D06F 58/20* (2006.01)
*F26B 23/00* (2006.01)
*D06F 58/10* (2006.01)

(52) U.S. Cl.
CPC .............. *D06F 58/28* (2013.01); *D06F 58/10* (2013.01); *D06F 58/206* (2013.01); *F26B 23/001* (2013.01); *D06F 2058/287* (2013.01); *D06F 2058/289* (2013.01); *D06F 2204/04* (2013.01)

(58) Field of Classification Search
CPC ......... D06F 2058/287; D06F 2058/289; D06F 2204/04; D06F 58/10; D06F 58/206; D06F 58/28; D06F 58/26; D06F 58/02; F26B 21/06; F26B 23/001
See application file for complete search history.

(56) References Cited

U.S. PATENT DOCUMENTS

| 7,905,098 B2 | 3/2011 | Pham .............................. 62/126 |
| 2005/0066538 A1 | 3/2005 | Goldberg et al. |
| 2005/0235660 A1 | 10/2005 | Pham |
| 2005/0246920 A1 | 11/2005 | Yabuuchi et al. .............. 34/515 |

(Continued)

FOREIGN PATENT DOCUMENTS

| CN | 1766208 | 5/2006 |
| CN | 1886628 A | 12/2006 |

(Continued)

OTHER PUBLICATIONS

Russian Decision to Grant a Patent dated Aug. 29, 2014 issued in Application No. 2013120070/12 (with English translation).

(Continued)

*Primary Examiner* — Jiping Lu
(74) *Attorney, Agent, or Firm* — Ked & Associates LLP

(57) ABSTRACT

A controlling method for a dryer is applied to a dryer, in which at least one of a heat pump system and a heater is selected as a heat source for heating air supplied in to a drum and a heat supply capacity of the heat pump system is more than that of the heater. The controlling method includes, when both the heat pump system and the heater are selected as the heat sources, turning the heat pump system on, turning the heater on after the heat pump system is normally turned on, turning the heater off to cool the drum and terminate drying after the drying is performed, and turning the heat pump system off after the heater is turned off.

10 Claims, 11 Drawing Sheets

(56) References Cited

U.S. PATENT DOCUMENTS

| | | |
|---|---|---|
| 2006/0032245 A1 | 2/2006 | Kates |
| 2007/0068178 A1 | 3/2007 | Honma et al. .................. 62/160 |
| 2009/0165328 A1 | 7/2009 | Grunert et al. |
| 2010/0077787 A1 | 4/2010 | Masuda et al. .............. 62/324.5 |
| 2010/0083527 A1 | 4/2010 | Grunert et al. |
| 2010/0242297 A1 | 9/2010 | Azpilicueta et al. |
| 2011/0119952 A1 | 5/2011 | Nawrot et al. |

FOREIGN PATENT DOCUMENTS

| | | |
|---|---|---|
| CN | 1906451 | 1/2007 |
| DE | 31 13 471 A1 | 10/1982 |
| DE | 44 09 607 A1 | 10/1994 |
| DE | 43 30 456 C1 | 3/1995 |
| DE | 10 2008 031 495 A1 | 1/2010 |
| DE | 10 2008 040 853 A1 | 2/2010 |
| EP | 0 999 302 A1 | 5/2000 |
| EP | 2 034 084 A1 | 3/2009 |
| EP | 2 075 369 A2 | 7/2009 |
| JP | 2007-082588 A | 4/2007 |
| JP | 2007-143631 A | 6/2007 |
| JP | 2007-244567 A | 9/2007 |
| JP | 2007-301130 A | 11/2007 |
| JP | 2010-63752 A | 3/2010 |
| KR | 10-1996-0024190 A | 7/1996 |
| KR | 10-2005-0118439 | 12/2005 |
| KR | 10-2006-0046994 A | 5/2006 |
| KR | 10-2011-0029579 A | 3/2011 |
| RU | 2011 132 067 A | 2/2013 |
| WO | WO 2005/032322 A2 | 4/2005 |
| WO | WO 2010/003936 | 1/2010 |
| WO | WO 2010/012708 | 2/2010 |

OTHER PUBLICATIONS

Chinese Office Action dated Jan. 7, 2015 (with translation).
European Search Report issued in Application No. 12763494.7 dated Feb. 27, 2015.
Chinese Office Action issued in Application No. 201280016399.1 dated May 19, 2015 (with English translation).
International Search Report and Written Opinion dated Oct. 18, 2012, issued in Application No. PCT/KR2012/002221.
European Search Report issued in Application No. 11829546.8 dated Jul. 22, 2015.
Final Office Action dated Jan. 7, 2015, issued in U.S. Appl. No. 13/247,314.
Australian Office Action dated Dec. 19, 2016.

CONTROLLING METHOD FOR CLOTHES DRYER

CROSS-REFERENCE TO RELATED PATENT APPLICATIONS

This application is a U.S. National Stage Application under 35 U.S.C. §371 of PCT Application No. PCT/KR2012/002221, filed Mar. 27, 2012, which claims priority to Korean Patent Application Nos. 10-2011-0028387, filed Mar. 29, 2011 and 10-2012-0023032, filed Mar. 6, 2012.

TECHNICAL FIELD

The present disclosure relates to a controlling method for a clothes dryer capable of drying clothes and the like, and more particularly, a controlling method for a clothes dryer capable of enhancing energy efficiency and reducing a drying time so as for the dryer to operate in an efficient and stable manner, by virtue of using at least one of a heat pump system and a heater as a heat source for heating up air for drying a target to be dried.

BACKGROUND ART

In general, a clothes processing apparatus having a drying function, such as a washing machine or a clothes dryer, is an apparatus in which clothes (laundry, etc.), which have completely washed and then dehydrated, are introduced into a drum and hot air is supplied into the drum to evaporate moisture contained in the clothes so as to dry the clothes.

As one example, a clothes dryer includes a drum rotatably installed inside a main body for accommodating clothes therein, a driving motor for driving the drum, a ventilation fan for blowing air into the drum, and a heating unit for heating up air introduced into the drum. The heating unit may be a type of heater, which uses electric resistance heat of high temperature generated by electrical resistance or heat of combustion generated by burning gas.

Meanwhile, air exhausted from the drum becomes hot humid air due to containing moisture from the clothes within the drum. Here, depending on a method of treating such hot humid air, dryers may be classified, for example, into a circulating type dryer, in which hot humid air circulates without being exhausted outside the dryer to cool air below dew-point temperature through a heat exchanger, and accordingly moisture contained in the hot humid air is condensed to be resupplied, and an exhausting type dryer, in which hot humid air passing through the drum is exhausted directly to the outside.

For the circulating type dryer, in order to condense air discharged out of the drum, air should be cooled below the dew-point temperature and heated by the heating unit prior to being resupplied into the drum. Therefore, when a heater is employed as the heating unit, a heat exchanger for condensing hot humid air discharged out of the drum is separately needed, and thereby thermal energy supplied by the heater is rather discharged to the outside due to heat exchange with the heat exchanger. This structure has an advantage of supplying thermal energy as much as being necessary by use of the heater but causes a problem of lowering thermal efficiency and increasing energy consumption. Also, for air circulation, moisture should be removed sufficiently, which causes the heat exchanger to be larger in volume and a drying time to be longer.

For the exhausting type dryer, hot humid air should be exhausted to the outside and external air of room temperature should be introduced and heated up to temperature as high as being required by means of a heating unit. When a heater is employed as a heating unit in the exhausting type dryer, it has advantages of not separately needing a heat exchanger and reducing a drying time by supplying thermal energy as much as being required by use of the heater. However, the hot air discharged to the outside is discharged directly to the outside with containing thermal energy transferred by the heating unit, thereby lowering thermal efficiency and increasing energy consumption.

Therefore, in recent time, a dryer, which is configured such that non-used energy is recollected from air discharged out of the drum and reused for heating air supplied into the drum so as to enhance energy efficiency, is being introduced. An example of such dryer is a dryer having a heat pump system. The heat pump system includes two heat exchangers, a compressor and an expander (expansion apparatus). With the configuration of the heat pump system, a refrigerant which circulates in the system recollects energy contained in hot air exhausted and the recollected energy is used to heat air supplied into the drum, thereby enhancing the energy efficiency.

In detail, the heat pump system includes an evaporator at an exhaust side from the drum and a condenser at an inlet side of the drum. Accordingly, a refrigerant absorbs thermal energy through the evaporator and then is pressurized by a compressor to be a refrigerant of high temperature and high pressure. Afterwards, the thermal energy contained in the refrigerant is transferred to air, which is introduced into the drum, through the condenser, which allows hot air to be generated by using the energy which is wasted.

However, when the heat pump system is applied to a dryer, a performance of the system depends on capacities of an evaporator for absorbing thermal energy and a condenser for discharging energy, and a capacity of a compressor for compressing a refrigerant. Hence, it is ideal to design the heat pump system based on required thermal energy, but sizes or capacities of the compressor used in the dryer, and the condenser and the evaporator serving as heat-exchangers, actually have to be limited. Therefore, when the heat pump system is used as a heating unit for heating air supplied into the drum, it has an advantage in the aspect of energy efficiency but has a problem of increasing a drying time due to the capacity limitation of the heat pump system. In addition, regarding the characteristic of the heat pump system, an overload may occur in the compressor like, resulting in lowered reliability of the heat pump system.

Upon performing a drying operation merely using the heat pump system, a quantity of heat transferred from the condenser to air is insufficient and accordingly a drying time is extended. To overcome such problem, a dryer having an auxiliary heater in addition to the condenser heat pump system has been introduced. Accordingly, when heat is not sufficiently supplied from the condenser due to the heat pump system not reaching a normal state at the beginning of running thereof, the auxiliary heater runs together with the heater to supply hot air heated up to temperature appropriate for drying from the initial operation, and also more heat is supplied by the heater even when the heat pump system is in the normal state, thereby reducing the drying time.

Here, in the circulating type dryer, since air circulates via the evaporator and the condenser, the heat pump system can normally operate only when temperature and humidity of air when flowing through the evaporator and the condenser are within an appropriate range. That is, when the evaporator fails to sufficiently cool hot air introduced into the evaporator due to excessively high temperature of the hot air, air having temperature over an appropriate range is introduced into the condenser, thereby lowering a heat transfer performance of the condenser. Consequently, when the refrigerant flowing through the condenser is not cooled sufficiently, a liquid refrigerant is introduced into the compressor or discharge pressure of the compressor is excessively raised, thereby badly influencing on reliability of the compressor.

If an auxiliary heater is added to the circulating type dryer having the heat pump system, the temperature of air introduced into the evaporator increases much more, which makes it more difficult to prevent an excessive load from working on the compressor at the beginning of running the heat pump system.

DISCLOSURE OF INVENTION

Technical Problem

Therefore, to obviate those problems, an aspect of the detailed description is to provide a dryer capable of enhancing energy efficiency by using a heat pump system and reducing a drying time by additionally using a heater.

Another aspect of the detailed description is to provide a controlling method for a dryer capable of enhancing reliability of a heat pump system by efficiently preventing an overload of a compressor even with using both the heat pump system and a heater.

Solution to Problem

To achieve these and other advantages and in accordance with the purpose of the present invention, as embodied and broadly described herein, there is provided a controlling method for a dryer, in which at least one of a heat pump system and a heater is selected as a heat source for heating air supplied in to a drum and a heat supply capacity of the heat pump system is more than that of the heater, the method including, when both the heat pump system and the heater are selected as the heat sources, turning the heat pump system on, turning the heater on after the heat pump system is normally turned on, turning the heater off to cool the drum and terminate drying after the drying is performed, and turning the heat pump system off after the heater is turned off.

With the configuration, when a heat supply capacity of the heat pump system is greater than that of the heater, such heat supply capacities may be considered in view of turning on and off the heat pump system and the heater as the heat sources, which may result in stable operations of loads.

Here, the method may further include running the drum by driving the driving motor. The running of the drum may be performed by performing reverse rotation and forward rotation of the driving motor in a sequential manner, and the turning on of the heat pump system may be started after forward rotation of the driving motor.

With the configuration, prior to turning the heat pump system on, the drum may be run by the driving motor so as to allow loads to be sequentially started.

In the meantime, the method may further include determining whether or not a compressor included in the heat pump system normally operates. The turning on of the heater may be performed after checking the heat pump system is normally turned on. The determining of whether or not the compressor normally operates may be performed by comparing a temperature variation of a refrigerant having passed through the compressor with a preset reference temperature variation.

With the configuration, in the dryer having the heat pump system and the heater, the heater may be turned on after the normal operation of the heat pump system is checked. That is, when the heater is turned on in a state that the compressor does not normally operate due to an existence of error, air heated by the heater may flows through the condenser of the heat pump system, which may result in erroneous heat transfer in the condenser. Accordingly, a refrigerant of high temperature may be introduced into the compressor, thereby further deteriorating the state of the compressor.

Therefore, the heater may be turned on after checking that the compressor normally operates, thus to prevent an introduction of a refrigerant of high temperature or a refrigerant in a liquid phase into the compressor.

Here, those steps may be performed right after the compressor is started during the drying operation. That is, when an auxiliary heater is needed to be run even after checking whether the compressor normally operates at the beginning, the heat may be turned on after checking whether the compressor normally operates, thereby preventing damage of the compressor.

Here, whether or not the compressor normally operates may be determined by measuring discharge pressure of the compressor. That is, if heat transfer is not properly performed in the compressor, the discharge pressure of the compressor may be raised due to the refrigerant of high temperature. Therefore, the discharge pressure may be checked by use of a pressure sensor or the like so as to determine whether the compressor normally operates.

Whether or not the compressor normally operates may also be checked by measuring a temperature of a refrigerant discharged from the compressor. That is, the temperature of the refrigerant is not high at the beginning of running the compressor, but as the compressor is running to reach its normal state, the temperature of the refrigerant increases. Therefore, the temperature of the refrigerant may be detected to check whether the compressor normally operates according to a temperature variation of the refrigerant. To this end, the determining of whether or not the compressor normally operates may include measuring a temperature Ti of a refrigerant discharged from the compressor, measuring a temperature T2 of the refrigerant discharged from the compressor after a predetermined time from the measurement of T1, and determining whether or not the compressor normally operates according to a difference between T1 and T2.

Here, when the difference value of T2−T1 is greater than a predetermined value, it may be determined that the compressor normally operates. The step may further include stopping power supply to the compressor and displaying an existence of error on the dryer when the difference value of T2−T1 is smaller than the predetermined value.

Advantageous Effects of Invention

The present disclosure may have an effect of allowing stable drying by controlling a target to be dried not to be damaged even when performing the drying operation using two different heat sources.

The present disclosure may allow for stably performing the drying operation using two different heat sources, so as to efficiently preventing an overload of the compressor with using both the heat pump system and the heater, thereby enhancing reliability of the heat pump system.

When a heat supply capacity of the heat pump system is greater than that of the heater, such heat supply capacities may be considered in view of turning on and off the heat pump system and the heater as the heat sources, which may result in stable operations of loads.

The drying operation may be performed by at least one of two different heat sources, so as to enhance energy efficiency or reduce a drying time according to a user selection. Consequently, it may provide effects of reducing energy consumption and increasing user convenience.

Also, a user may convert a drying mode and recognize such conversion of the drying mode in simple ways, thereby improving user s convenience.

In addition, a use time of the dryer may be efficiently decided, which may result in saving electric charges.

BEST MODE FOR CARRYING OUT THE INVENTION

To achieve these and other advantages and in accordance with the purpose of the present invention, as embodied and broadly described herein, there is provided a controlling method for a dryer, in which at least one of a heat pump system and a heater is selected as a heat source for heating air supplied in to a drum and a heat supply capacity of the heat pump system is more than that of the heater, the method including, when both the heat pump system and the heater are selected as the heat sources, turning the heat pump system on, turning the heater on after the heat pump system is normally turned on, turning the heater off to cool the drum and terminate drying after the drying is performed, and turning the heat pump system off after the heater is turned off.

MODE FOR THE INVENTION

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Figure 1:
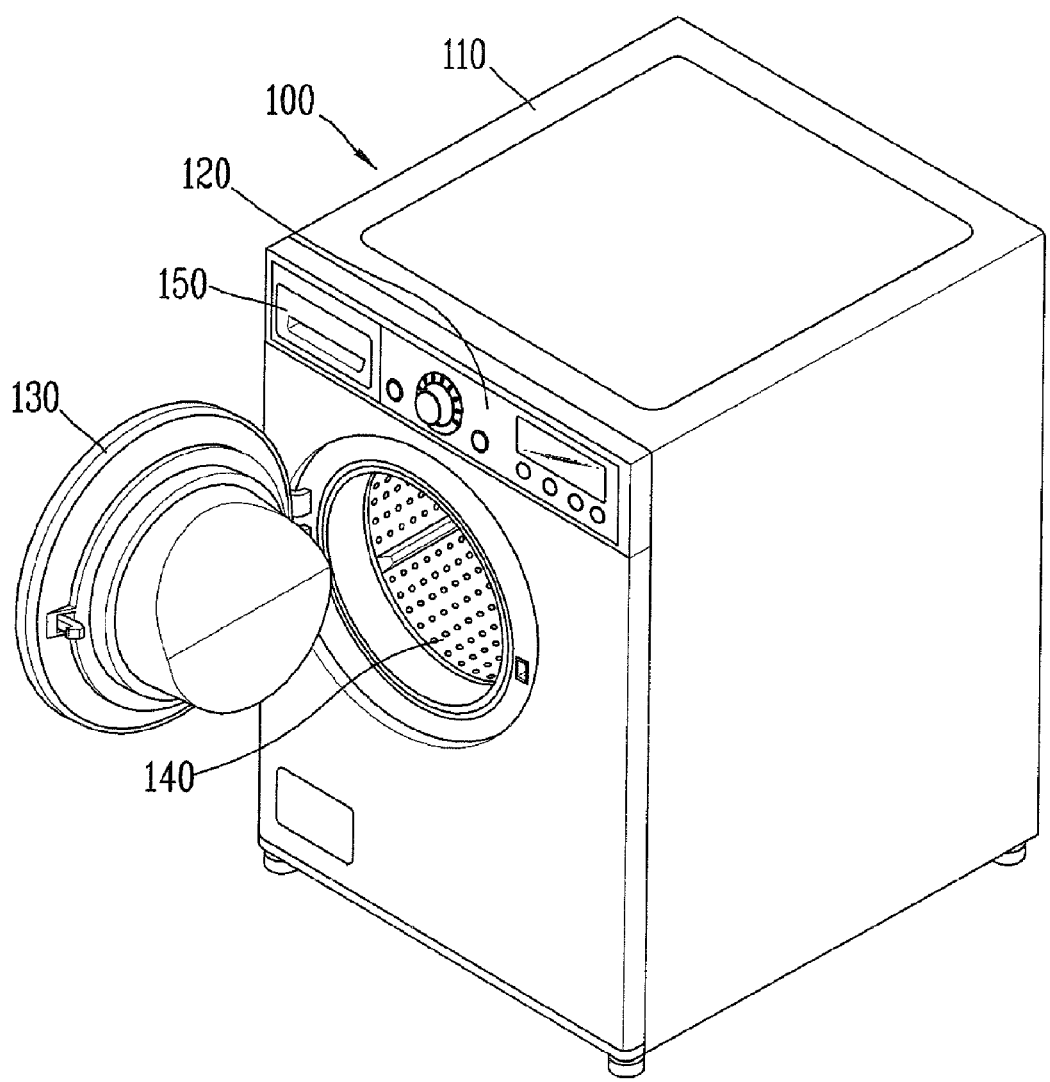
FIG. 1 is a schematic view showing an appearance of a dryer in accordance with one exemplary embodiment.

FIG. 1 is a schematic view showing an appearance of a dryer in accordance with one exemplary embodiment. As shown in FIG. 1, a dryer 100 may include a main body 110 defining an appearance, and a drum 10 rotatably installed inside the main body 110 and having a plurality of lifters protruding from an inner circumferential surface. An opening 140 through which clothes as a target to be dried are introduced may be formed at a front surface of the main body.

The opening 140 may be opened or closed by a door 130. A control panel 120 having a variety of manipulation buttons for operating the dryer and a display unit may be located above the opening 140. A drawer 150 may be disposed at one side of the control panel 120. The drawer 150 may contain therein a liquid or the like to be sprayed into the drum.

Figure 2:
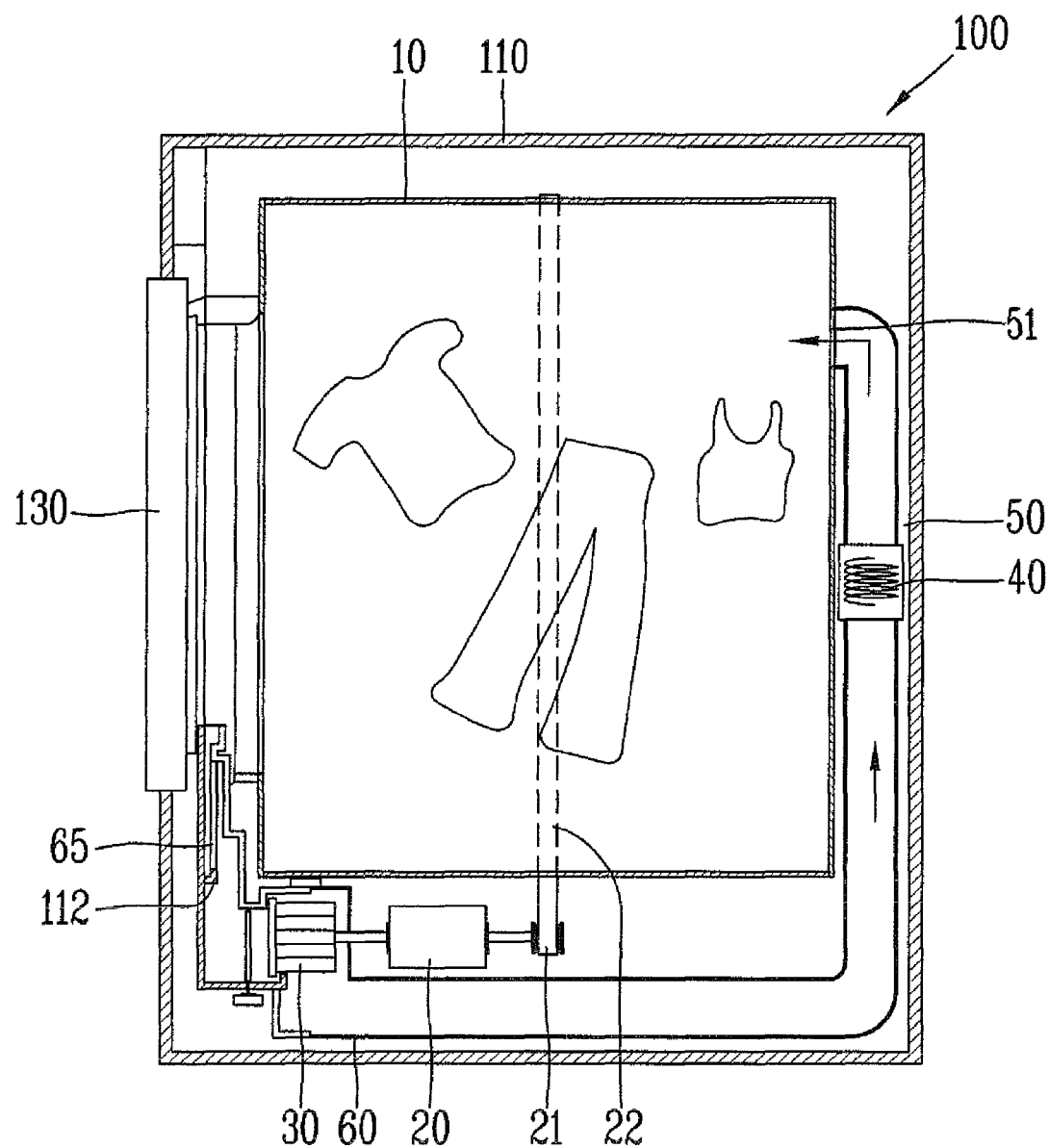
FIG. 2 is a schematic view showing an inside of the dryer of FIG. 1.
Figure 3:
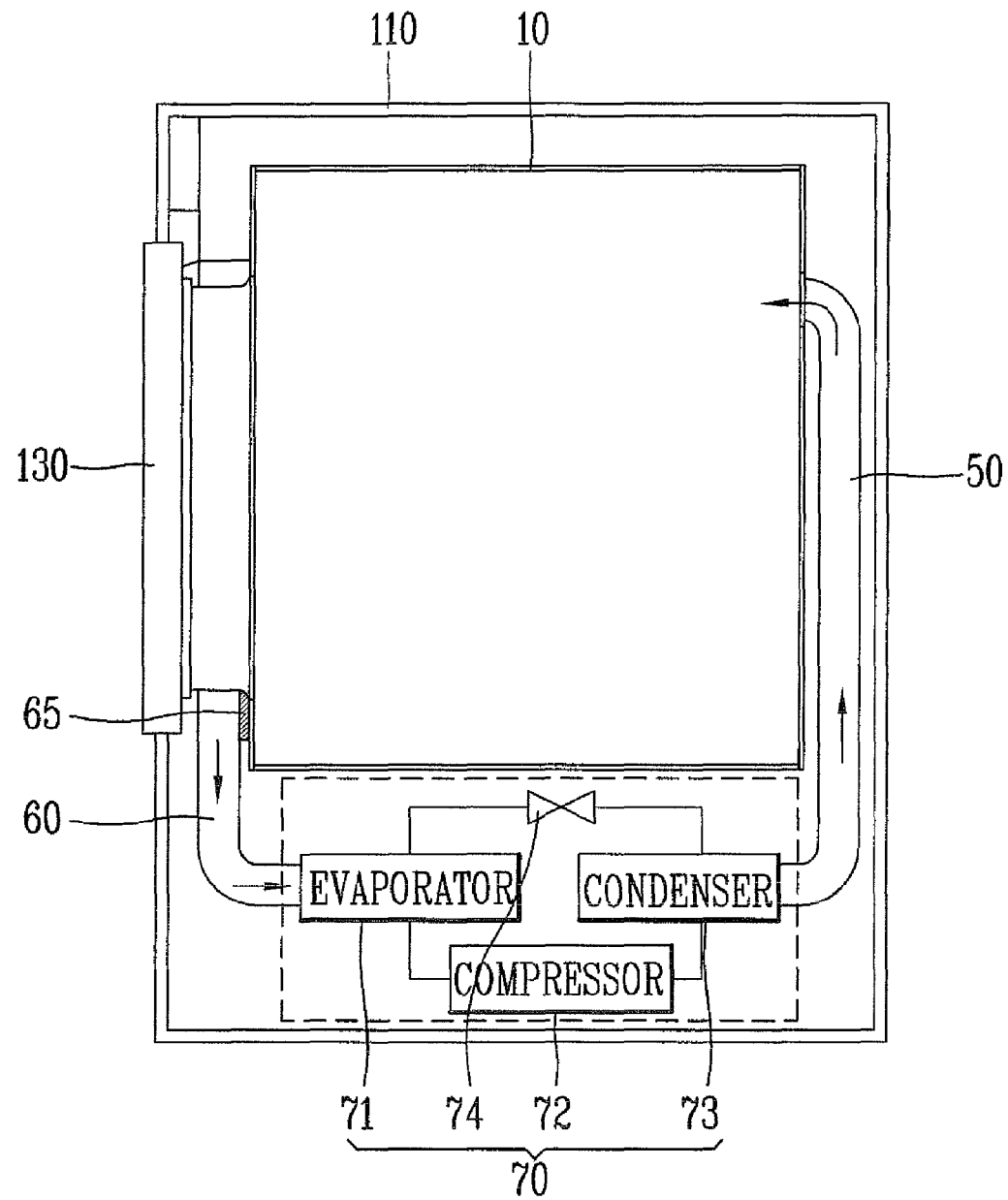
FIG. 3 is a schematic view showing a heat pump system provided in the dryer of FIG. 2.

FIGS. 2 and 3 are schematic views showing an inside of the exemplary embodiment of FIG. 1. As shown in FIG. 2, the drum 10 may be rotatably installed inside the main body 110 so as for targets to be dried to be dried therein. The drum 10 may be rotatably supported by supporters (not shown) at front and rear sides thereof.

The drum 10 may be connected to a driving motor 20 located at a lower portion of the dryer via a driving force transfer belt 22 so as to receive a rotational force from the driving motor 20. A pulley 21 may be disposed at one side of the driving motor 20 and the driving force transfer belt 22 for driving (working, running, rotating) the drum 10 may be connected to the pulley 21.

A suction duct 50 may be installed at a rear side of the drum 10, and a heater 40 for heating air sucked may be installed at the suction duct 50. The heater 40 may be configured to use electrical resistance heat of high temperature for enhancing efficiency of a space occupied in the dryer. The suction duct 50 may be provided with a discharge opening 51 connected to the rear of the drum and allowing heated air to be discharged into the drum therethrough.

At a lower side of the front of the drum 10 may be installed a filter 65 for filtering off foreign materials, such as lint and the like included in air discharged out of the drum 10, and an exhaust duct 60 through which foreign material-filtered air can be discharged out of the drum 10. The suction duct 50 and the exhaust duct 60 may be divided into suction and exhaust based on the drum 10. Here, FIG. 2 exemplary illustrates the circulating type dryer, but the present disclosure may not be limited to the type. Alternatively, the present disclosure may be applicable to an exhausting type dryer.

A lint filter installation unit 112 for installation of the filter 65 into which the air exhausted from the drum 10 is introduced may be formed near the lower portion of the front of the drum 10. The lint filter installation unit 112 may not only provide an installation space for the filter 65 for filtering the lint contained in hot air exhausted from the drum 10 but also define a part of passage through which hot air flows.

In the exemplary embodiment of the circulating type dryer as shown in FIG. 2, the suction duct 50 and the exhaust duct 60 may be integrally formed with each other so as to define one circulation channel 55. However, in an exemplary embodiment (not shown) for an exhausting type dryer, the suction duct and the exhaust duct may not be connected to each other.

A ventilation fan 30 for sucking air existing in the drum 10 and forcibly blowing the sucked air may be installed in the exhaust duct 60. For example, for the circulating type dryer of FIG. 2, the exhaust duct 60 may serve to induce air, which is forcibly blown by the ventilation fan 30, into the drum 10 via the suction duct 50. On the contrary, for the exhausting type dryer, the exhaust duct may serve to induce air forcibly blown by the ventilation fan 30 to the outside.

This exemplary embodiment may employ a pull-type ventilation fan, which exists in a duct for exhausting air out of the drum therethrough so as to suck the air discharged out of the drum toward the exhaust duct.

As aforementioned, at the one side of the driving motor 20 may be provided the pulley 21 to which the driving force transfer belt 22 for driving the drum 10 is connected. Here, the other side of the driving motor 20 may be connected with a driving shaft of the ventilation fan 30 such that the driving motor 20 can drive the ventilation fan 30. Hence, in the exemplary embodiment of FIG. 2, when the driving motor 20 rotates, the drum 10 and the ventilation fan 30 rotates simultaneously.

The exemplary embodiment shown in FIG. 3 shows a heat pump system 70 which absorbs waste heat from air discharged from the drum inside the main body and supplies the absorbed waste heat to air introduced into the drum. The exemplary embodiment of FIG. 3 may be a circulating type dryer or an exhausting type dryer.

The heat pump system 70 may construct a thermodynamic cycle by including a first heat exchanger 71 for absorbing waste heat from air discharged out of the drum 10, a compressor 72, a second heat exchanger 73 for heating air introduced into the drum, and an expansion valve 74. That is, the first heat exchanger 71, the compressor 72, the second heat exchanger 73 and the expansion valve 74 may be connected by pipes in a sequential manner.

Figure 4:
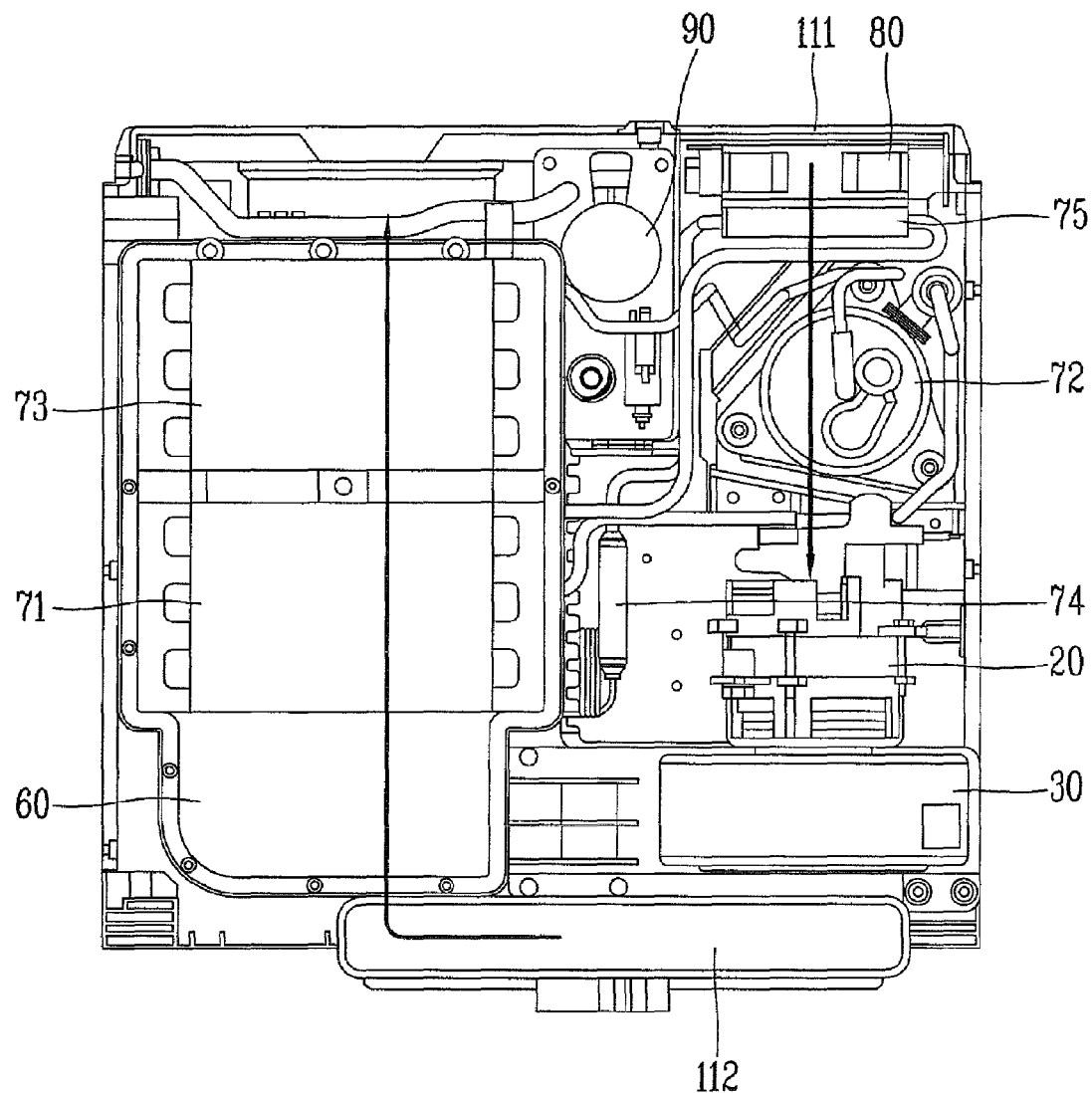
FIG. 4 if a schematic view showing the heat pump system and operating loads in the dryer of FIG. 1.

FIG. 4 shows an example that the heat pump system is mounted in the main body of the dryer. As shown in FIG. 4, the first heat exchanger 71 may be an evaporator based on a refrigerant of the heat pump system, and the second heat exchanger 73 may be a condenser. Each of the first heat exchanger 71 and the second heat exchanger 73 may have therein one refrigerant pipe disposed in a zigzag line. The refrigerant pipe may have radiation pins on its surface so as to ensure a sufficient heat transfer area with air.

Here, the evaporator may be the same as or smaller than the condenser in view of a heat exchange capacity. That is, FIG. 4 exemplarily illustrates that the heat exchange capacity of the evaporator is the same as that of the condenser. Unlike to the exemplary embodiment shown in FIG. 4, the heat exchange capacity of the evaporator may alternatively be designed to be smaller than that of the condenser. This is for collecting waste heat as much as possible so as to use for heating air introduced into the drum, and also for ensuring reliability of the heat pump system by allowing for discharging energy absorbed by the refrigerant as much as possible through the condenser.

Various types of valves may be employed as the expansion valve 74. This exemplary embodiment employs a Linear Expansion Valve (LEV) whose opening rate is controlled by an electrical signal. That is, a controller 200 to be explained later may decide the opening rate of the valve by receiving an input pulse.

Figure 5:
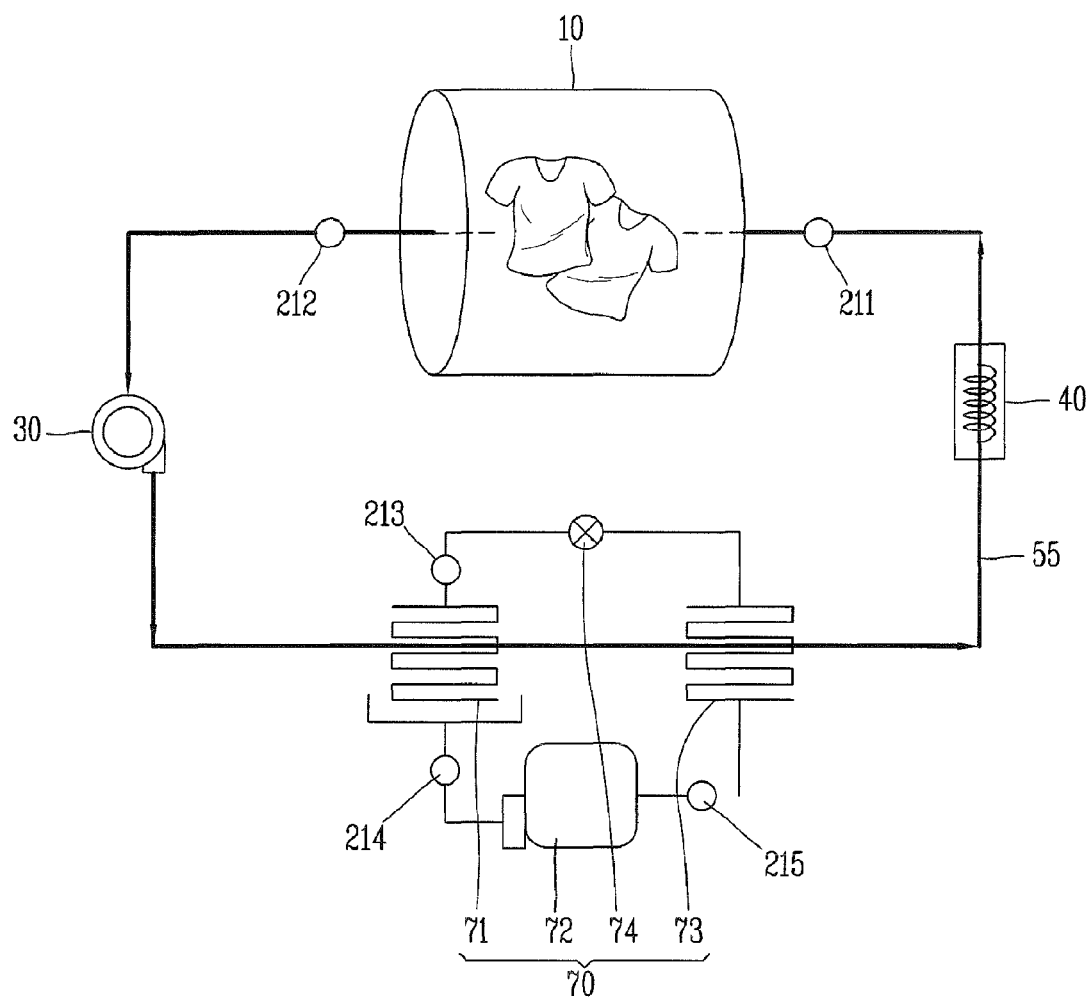
FIG. 5 is a schematic view showing a contact between an air passage of the dryer and a heat source.

FIG. 5 shows an exemplary circulating type dryer, which shows a path of heating circulated air by the heat pump system and the heater. As shown in FIG. 5, a refrigerant of the heat pump system exchanges heat with hot humid air, which is discharged out of the drum, in an evaporator as the first heat exchanger, so as to be in a gaseous state of low temperature. The refrigerant in the gaseous state is then compressed in the compressor to become a gaseous state of high temperature and high pressure. Afterwards, the refrigerant exchanges heat with cold air, which is to flow into the drum, in a condenser as the second heat exchanger, so as to be in a state of low temperature and high pressure. The refrigerant is expanded in the expansion valve to change into a liquid state of low temperature and low pressure.

Here, with regard to the circulating type dryer, air which has passed through the drum becomes hot and humid due to moisture being evaporated from a target to be dried. The hot humid air is then cooled into a low dry state, which moisture is removed, through the heat exchange in the first heat exchanger, so as to be in a state capable of being resupplied into the drum. On the contrary, with regard to the exhausting type dryer, air is changed into hot humid air due to moisture being evaporated from a target to be dried. The hot humid air is then cooled into a low dry state through the heat exchange in the first heat exchanger, and exhausted to the outside.

The heat pump system 70 includes the evaporator 71, the expansion apparatus 74, the compressor 72 and the condenser 73. Here, the evaporator 71 and the condenser 73 are installed on a circulation channel 55, and the expansion apparatus 74 and the compressor 72 are disposed outside the circulation channel 55. Accordingly, while air introduced from the lint filter installation unit 112 flows along the circulation channel 55, it flows sequentially via the evaporator 71 and the condenser 73 so as to be cooled (condensed) and reheated. Moisture contained in hot air is condensed during a cooling process to form on a surface of the evaporator 71 or be dropped down from the evaporator. The thusly-generated condensed water is first collected in a condensed water collecting portion located below the evaporator 71.

As a heat source for heating air introduced into the drum up to high temperature, at least one of the condenser as the second heat exchanger and the heater 40 may be used. The heated air is introduced into the drum to dry the target to be dried and then flows down along the front of the drum. Such air accordingly flows through the exhaust duct via the lint filter.

The suction duct 50 may be installed at the downstream of the circulation channel 55. The suction duct 50 may be connected to the circulation channel 55 such that the hot air introduced from the circulation channel 55 can be resupplied into the drum. In addition, the heater 40 may be installed inside the suction duct 50, so as to reheat the hot air which has been first heated by the condenser 73. The heater 40 may be turned on (run, started, driven) at an initial time when the heat pump system does not reach a normal state to prevent temperature of hot air from being lowered, or reduce a drying time by additionally providing heat even in the state that the heat pump system reaches the normal state.

Here, the heater may be selectively used. When air is heated only using the heat pump system as a heat source, it is excellent in the aspect of energy efficiency, but causes a problem of extending the drying time. Therefore, the heater may be used as an auxiliary heat source to reduce the drying time according to a user selection. Alternatively, only the heater may be used as the heat source according to a user selection. A dryer which performs a drying operation by selectively using the heat pump system and the heater may be referred to as a hybrid dryer.

Meanwhile, when the heater is selectively used, the heat pump system may serve as a main heat source and the heater may serve as an auxiliary heat source. Here, the heat pump system, as aforementioned, is used as the main heat source in the aspect of the energy efficiency. In this case, a heat supply capacity of the heat pump system as the main heat source may be configured to be larger than that of the heater. As aforementioned, since the heat pump system is used as the main heat source and the heater is used as the auxiliary heat source, energy efficiency can be enhanced by making the heat supply capacity different according to the heat source.

In terms of the configuration, energy which remains unused can be collected from air discharged out of the drum and reused to heat air supplied into the drum, thereby increasing energy efficiency. Also, the heater as well as the heat pump system can be used as the heat source for heating the air supplied into the drum, which may result in reduction of a drying time.

Figure 6:
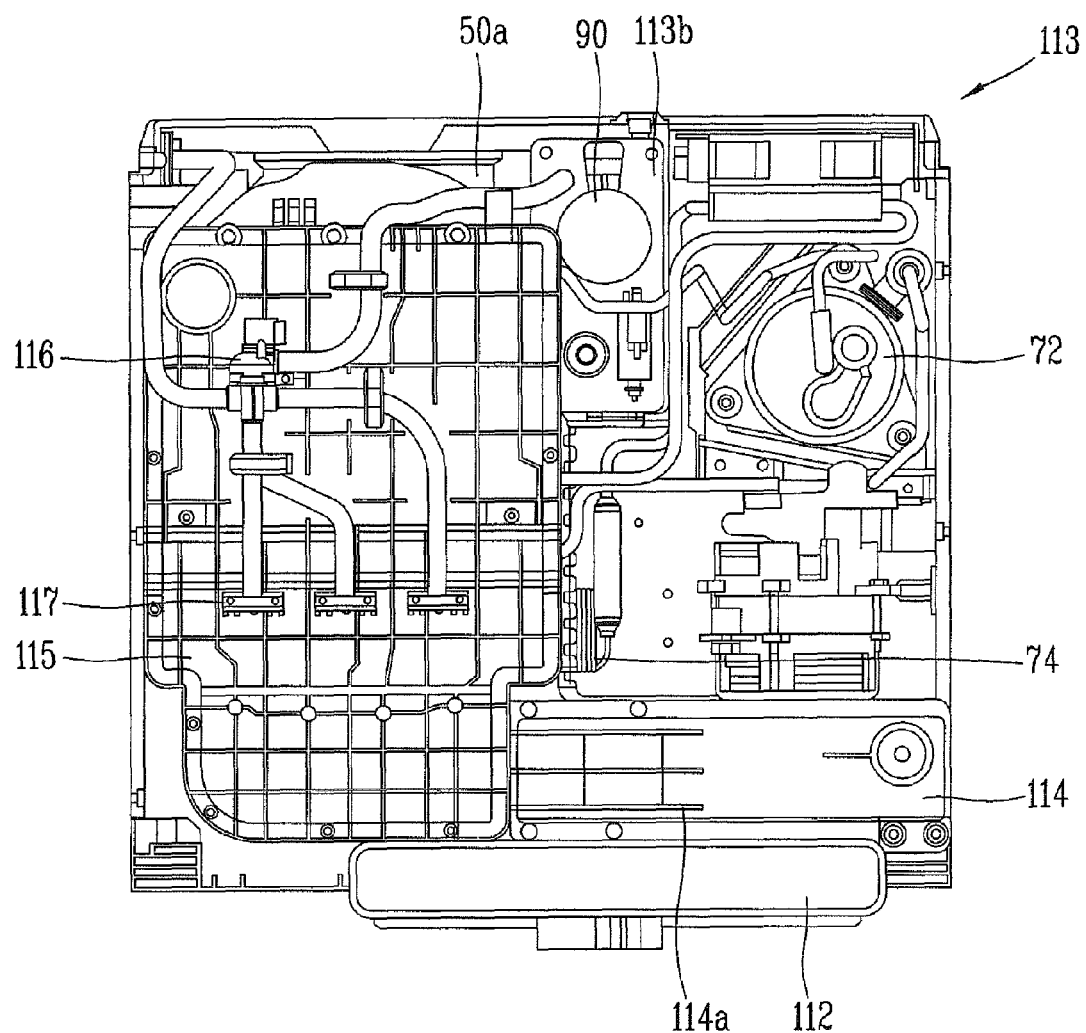
FIG. 6 is a planar view showing a lower surface of a main body of the dryer.
Figure 7:
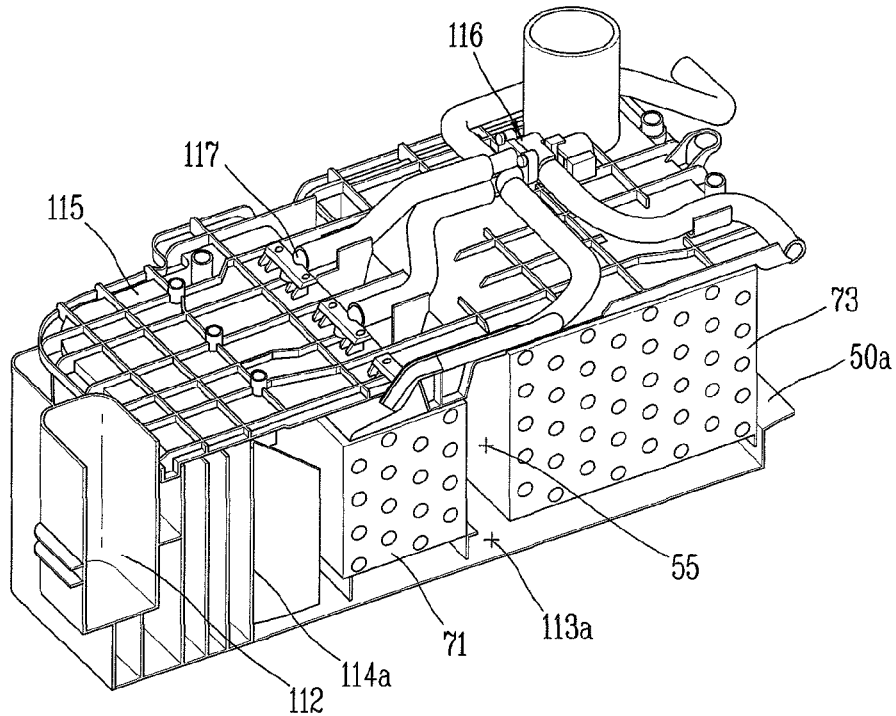
FIG. 7 is a partially cut-off view for showing the lower surface of the main body shown in FIG. 6.

FIG. 6 is a planar view showing a lower surface of a main body of the dryer, and FIG. 7 is a partially cut-off view for showing the lower surface of the main body shown in FIG. 6. As shown in FIGS. 6 and 7, a bottom surface 113 may be installed at a lower surface of the main body, configure a part of the circulation channel, and provide an installation space for stably supporting the heat pump system. In detail, based on FIG. 6, the circulation channel in which the evaporator 71 and the condenser 73 are installed is disposed at the left side and the expansion valve 74 and the compressor 72 are installed at the right side.

In addition, the lint filter installation unit 112 may be formed at a front portion (a lower portion in FIG. 6) of the main body and a circulation channel inducing unit 114 may be formed to communicate with the lint filter installation unit 112. The circulation channel inducing unit 114 communicating with the lint filter installation unit 112 may induce hot air exhausted from the drum toward the evaporator 71. To this end, the circulation channel inducing unit 114 may include a plurality of guide vanes 114a for guiding introduced air toward the evaporator 71.

The hot air induced by the guide vanes 114a may be introduced into the exhaust duct 60 or the circulation channel 55. The circulation channel 55 may be defined by the bottom surface 113 of the main body, partition walls (not shown) on the bottom surface 113, and a cover plate 115 for covering an upper portion of a space formed by the partition walls. That is, the circulation channel 55 is defined by the cover plate 115 and the partition walls of the bottom surface 113. Air flowing through the thusly-generated circulation channel 55 then flows sequentially via the evaporator 71 and the condenser 73 so as to be introduced into the suction duct 50 via a suction duct connection portion 50b formed at a rear surface of the main body.

In the meantime, a portion of the bottom surface of the main body, in which the evaporator and the condenser are disposed, may serve as a condensed water collecting portion 113a. That is, the condensed water which is generated due to air being condensed by the evaporator 71 is first collected in the condensed water collecting portion 113a. The collected condensed water is then introduced into a condensed water storing portion 113b located adjacent to the compressor 72. The condensed water collecting portion 113a and the condensed water storing portion 113b may be partitioned by a partition wall which is not shown, and communicate with each other via a through hole formed through the partition wall.

Accordingly, when a water level of the condensed water collected in the condensed water collecting portion 113a is raised over a predetermined level, the condensed water is introduced into the condensed water storing portion 113b via the through hole to be stored therein. The condensed water stored in the condensed water storing portion 113b may thusly be pumped to a control valve 116, which is installed at an upper portion of the cover plate 115, by a pump 90. The control valve 116 may distribute the condensed water supplied by the pump 90 into respective washing nozzles 117 to remove foreign materials such as lint attached onto the surface of the evaporator 71.

Here, the washing nozzles 117 may not always have to be provided in plurality. It may also be considered to wash the entire evaporator using one nozzle. Another example of removing such lint using a brush, which is installed to be movable along the surface of the evaporator, may also be considered.

Since the clothes dryer according to the present disclosure uses the heat pump system for maximization of energy efficiency, a refrigerant has to continuously circulate in the heat pump system. Here, in the heat pump system, heat exchange is generated between a refrigerant and air to be supplied into the drum by a phase change of the refrigerant. That is, a refrigerant in a liquid phase (liquid state) and a refrigerant in a gas phase (gaseous state) coexist on a passage of the refrigerant in the heat pump system.

Here, if heat is not sufficiently supplied from the evaporator, the refrigerant discharged from the evaporator is partially introduced into the compressor even in the liquid state. When the refrigerant in the liquid state is introduced into the compressor, it may be harmful to the compressor or lower energy efficiency, thereby causing a problem in reliability of the heat pump system.

Therefore, to detect such state, a temperature difference of a refrigerant having passed through the evaporator may be detected (sensed) so as to indirectly check dryness of the refrigerant. The exemplary embodiment of FIG. 5 includes a temperature sensor 213 installed at an inlet side of the evaporator, and a temperature sensor 214 at an outlet side of the evaporator 71 or an inlet side of the compressor 72.

Also, since the heater can be used as the heat source, heat load is accumulated in the heat pump system, which may cause an overload of the compressor 72. Hence, to sense this, it is necessary to measure the temperature of the refrigerant, respectively, at the inlet side and the outlet side of the compressor 72 so as to prevent the overload of the compressor 72. In the exemplary embodiment of FIG. 5, the temperature sensor 214 may be installed at the inlet side of the compressor 72, and a temperature sensor 215 may be disposed at the outlet side of the compressor 72. Here, the temperature sensors for the refrigerant may be attached onto a surface of an inlet pipe or discharge pipe connected to the compressor 72 to indirectly measure the temperature of the refrigerant.

Also, the clothes dryer is to dry a target to be dried, containing moisture, by supplying hot air, so the target to be dried has to be protected from damage due to the hot air. Accordingly, a temperature of the inlet side of the drum 10 is measured to control air introduced into the drum 10 not to be overheated, and a temperature of the outlet side of the drum 10 is measured to control the temperature of the target to be dried not to be increased because the target to be dried is sufficiently dried in the drum 10. Hence, a temperature sensor 211 may be installed at an inlet side of the drum 10 through which air is supplied into the drum 10, and a temperature sensor 212 may be installed at an outlet side of the drum 10 through which air is discharged from the drum 10. Also, a humidity sensor 220 may be installed inside the drum 10 contactable with the target to be dried so as to precisely control the dryness of the target to be dried, accommodated in the drum 10.

Figure 8:
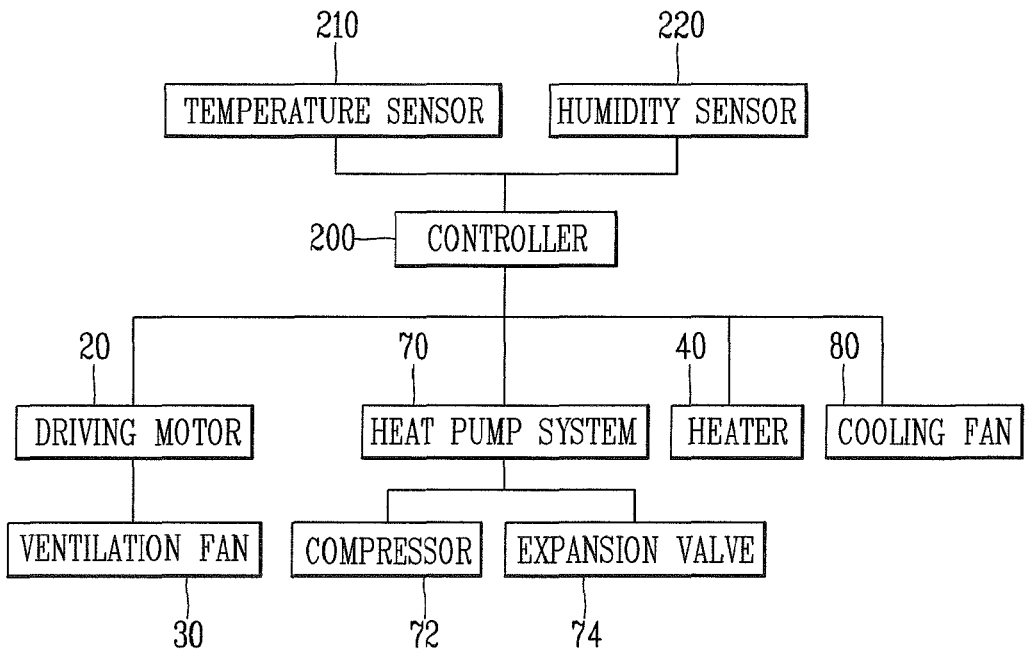
FIG. 8 is a schematic view showing an electrical connection for control of the dryer.

In this exemplary embodiment, the temperature sensors 210 (i.e., 211, 212, 213, 214 and 215) may preferably be implemented as a thermister. FIG. 8 shows various components electrically connected to a controller. As shown in FIG. 8, the temperature sensors 210 and the humidity sensor 220 may be electrically connected to a controller 200 installed in the dryer, thus to provide signals corresponding to measured temperature and humidity to the controller 200. The controller 200, in turn, controls an amount of refrigerant flowing in the heat pump system 70 by use of the expansion valve 74, control operations of the compressor 72 of the heat pump system 70 and the heater 40, control the driving motor 20 of the drum 10 to control the drum 10 and the ventilation fan 30, and control a cooling fan 80 to be explained later.

The heat pump system according to the exemplary embodiment shown in FIG. 4 may further include a third heat exchanger 75 as a second condenser for overcooling a refrigerant to appropriately maintain a state of a refrigerant introduced into the expansion valve 74. The refrigerant introduced into the expansion valve 74 has to be in a liquid phase. However, in some cases, it is introduced in a gas phase and thereby a flow of the refrigerant in the expansion valve 74 may be blocked. To prevent this problem, the second condenser 75 for overcooling the refrigerant may further be provided. Overcooling the refrigerant by the second condenser 75 may also have an effect of preventing an overload of the compressor.

A cooling fan 80 may further be provided to enhance efficiency of the second condenser 75. The cooling fan 80 may be disposed in the main body of the dryer to allow external air to be introduced into the main body via a suction opening 111 formed at the main body. Accordingly, the cooling fan 80 may have not only the functions of enhancing the efficiency of the second condenser 75 and preventing the overload of the compressor 72, but also a function of cooling the compressor 72 and the like by allowing the external air to be introduced into the dryer. This may result in reduction of an overload of the heat pump system. This may also be more efficient when the overload occurs in the compressor 72 in the hybrid dryer having the heater as another heat source separate from the heat pump system. The cooling fan 80 may be controlled by the controller 200.

The filter 65 shown in FIG. 3 may filter foreign materials which may be contained in air discharged out of the drum 10. Especially, in the dryer having the heat pump system which reuses air discharged from the drum, foreign materials such as lint and the like should be removed by the filter.

The drying process for a target to be dried, performed by the dryer, as aforementioned, may be regarded as a process of evaporating moisture by supplying heated air (hot air) into the drum. Here, for the sake of explanation, the drying process may be segmented based on dryness of the target to be dried.

Performing a drying operation only using the heat pump system as a heat source for supplying heat into the drum in view of energy efficiency may be referred to as a normal drying mode. Also, performing a drying operation using both the heat pump system and the heater as the heat source to reduce a drying time with considering the energy efficiency may be referred to as a high-speed drying mode. In addition, performing a drying operation only using the heater as the heat source may be referred to as a special drying mode. The terms for the drying modes are merely specified for convenience of explanation, and used to distinguish the heat source for heating air supplied into the drum.

In the dryer according to the aforementioned exemplary embodiment, both the normal drying mode and the high-speed drying mode may be applied according to a user selection. The special drying mode may also be applied according to the selection.

Each drying mode uses a different heat source, which results in different heat energy (thermal energy) supplied per hour, and different heat load applied to the heat pump system. Hence, a control for the heat source or the like may differ in each drying mode. This will be described in detail later.

Components disposed in the main body of the dryer are under control of the controller 200. The controller 200 may control those components based on measurements received from the temperature sensors and the humidity sensor.

Figure 9:
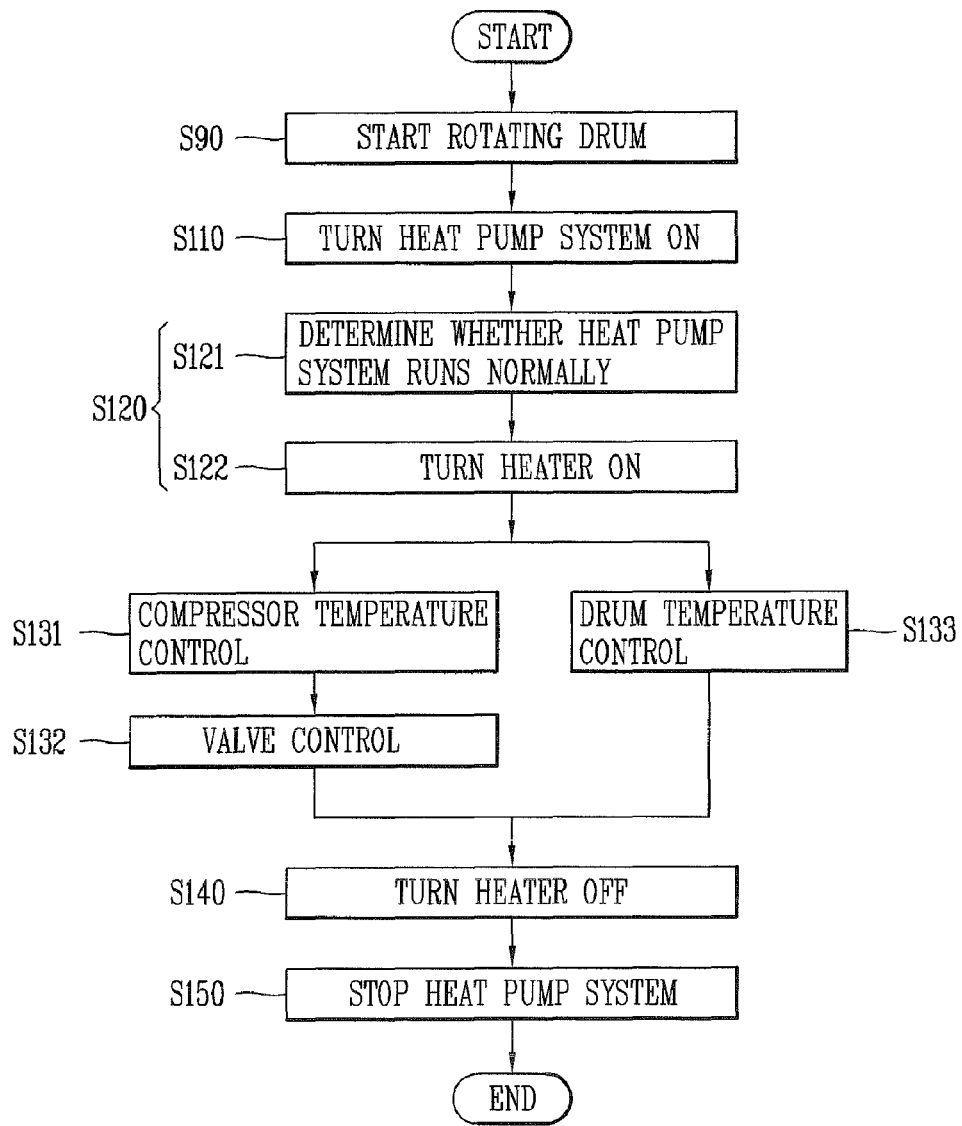
FIG. 9 is a flowchart showing a load operation control according to turning on and off a heat source.

Meanwhile, the control for the dryer may depend on turning on and off (starting and stopping, initiation and termination, activation and deactivation) of the heat source. FIG. 9 is a flowchart showing sequential steps of controlling the dryer based on turning on and off of the heat source. Especially, in the hybrid dryer using the heat pump system and the heater as the heat source, the sequence of turning on and off the heat sources may have significance. In addition, in a dryer which employs a heat pump system as a main heat source such that a heat supply capacity of the heat pump system is more than that of the heater, the sequence of turning on and off the heat sources may have a significant meaning.

As shown in FIG. 9, a controlling method for a dryer according to one exemplary embodiment may include turning the heat pump system on when the heat pump system and the heater are selected as the heat sources (S110), turning the heater on after the heat pump system is normally turned on (S120), turning the heater off for cooling the drum to terminate the drying operation after the drying progresses (S140), and turning the heat pump system off after turning the heater off (S150).

Here, the method may further include running (working, starting, rotating) the drum by driving the driving motor before turning the heat pump system on (S90). The step of running the drum (S90) may be performed by performing a reverse rotation and a forward rotation of the driving motor in the sequential manner, and the step of turning the heat pump system may be started after performing a forward rotation of the driving motor. From the perspective of the configuration, the drum is run by the driving motor prior to turning the heat pump system on, thereby sequentially running loads.

Figure 10:
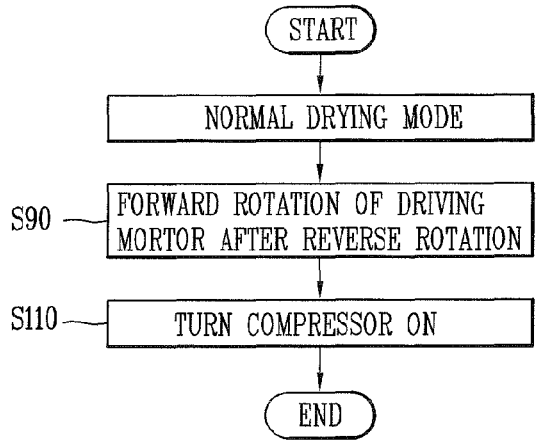
FIGS. 10 and 11 are flowcharts showing an initial operation control of various loads of the dryer.
Figure 11:
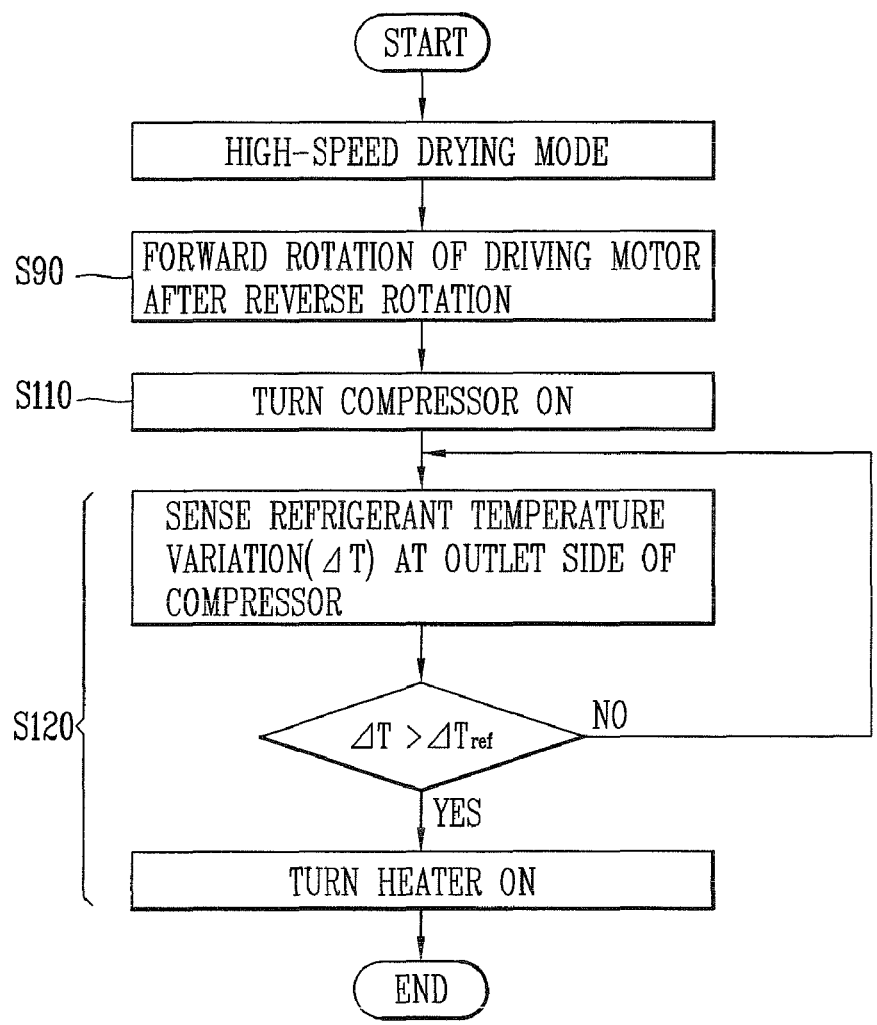

FIGS. 10 and 11 show segmented steps of the load operation control for running those loads. As shown in FIGS. 10 and 11, the controlling method for the dryer may include running the drum by driving the driving motor for the load operation control (S90), turning the heat pump system on by starting the compressor (S110), and turning the heater on as the heat source according to whether the compressor normally operates (S120). Here, FIG. 10 has omitted the step of turning on the heater (S120) because of the normal drying mode without using the heater.

The step of running the drum (S90) is performed by performing the reverse rotation and the forward rotation of the driving motor in the sequential manner for a predetermined time, and the step of turning the heat pump system on (S110) is started after forward rotation of the driving motor.

In more detail, when starting the drying process, the controller first runs (starts, initiates) the driving motor or the drum. Afterwards, the controller drives the compressor so as to turn the heat pump system on.

Upon running the drum, the controller reversely rotates and then forwardly rotates the driving motor for a short time. This is to set tension of a belt in the aspect of the characteristics of the hybrid dryer having a belt-type driving force transfer system. This is also to prevent flowing of overcurrent at the beginning of driving the driving motor in view of the characteristic of the driving motor. Here, the forward rotation and the reverse rotation of the drum by the driving motor are defined because a specific direction is limited to the forward rotation in the exemplary embodiment. Also, the ventilation fan in this exemplary embodiment is implemented as a pull-type ventilation fan, which is present in a duct, through which air is exhausted out of the drum, so as to suck the air discharged out of the drum toward the exhaust duct. Hence, it may be preferable to set the direction, in which the ventilation fan is rotated to suck the air toward the exhaust duct, as the forward rotation.

The steps shown in FIG. 10, may be performed in the normal drying mode, and the steps shown in FIG. 11 may be performed in the high-speed drying mode. In FIG. 10, the compressor is started after the forward rotation of the driving motor and accordingly the heat pump system is turned on (S110). Here, the controller runs the compressor after the forward rotation of the driving motor is performed for a predetermined time. This is to start the compressor after the ventilation fan is driven by driving the driving motor so as for the heat pump system to be smoothly run.

However, a heater operation control may further be performed in the high-speed drying mode. In the high-speed drying mode, the dryer uses the heater as well as the heat pump system as the heat sources. In this case, the controller may sense that the compressor is started and thereafter turn the heater on. This is to prevent an overload of the compressor at the beginning of driving the compressor, which may be caused due to the heater being first turned on.

The heater operation control is protection means for ensuring reliability of the compressor in the high-speed drying mode. For this, the method may include determining whether the compressor included in the heat pump system normally operates prior to turning the heater on (S121), and turning the heater on (S122). The step of turning the heater on (S122) may be performed after checking whether the heat pump system normally operates. The determining as to whether the compressor normally operates (S121) may be performed by comparing a temperature variation of a refrigerant which has flowed through the compressor with a preset reference temperature variation.

In detail, the heater operation control may be applied when the heater as well as the heat pump system are selected as the heat sources for heating air supplied into the drum. The heater operation control may include turning the heat pump system on (S110), and determining whether the compressor included in the heat pump system normally operates (S120). The heater operation control may be characterized in that whether to use the heater as the heat source is decided according to whether the compressor normally operates.

Figure 12:
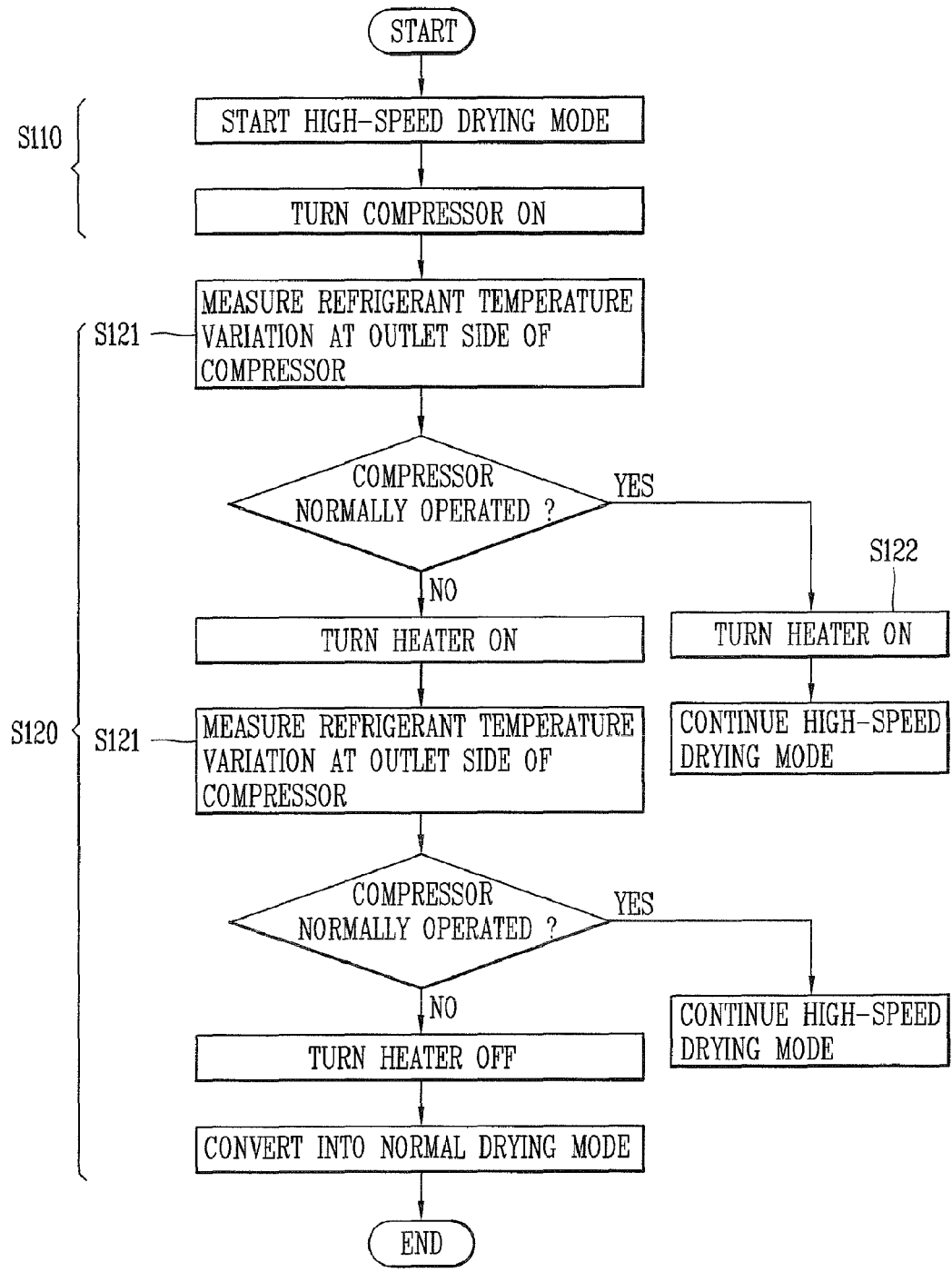
FIG. 12 is a flowchart showing a heater operation control according to whether or not a compressor of a heat pump system normally operates.

FIG. 12 shows an exemplary flowchart of the heater operation control. As shown in FIG. 12, the step of turning the heat pump system on (S110) indicates starting the operation of the heat pump system of the heat sources in response to the drying operation being started. That is, as aforementioned, upon reception of a drying start command, the controller controls the driving motor to perform the reverse rotation and the forward rotation in the sequential manner, thereby starting the compressor. Here, a temperature of a refrigerant at an outlet side of the compressor is first measured.

The determination as to whether the compressor included in the heat pump system normally operates (S120) indicates determining whether the compressor normally operates according to a temperature variation of a refrigerant which has passed through the compressor. Hence, the step of measuring the temperature variation of the refrigerant having passed through the compressor (S121) may be performed.

That is, after running the compressor for a predetermined time, the controller remeasures the temperature of the refrigerant at the outlet side of the compressor, thereby obtaining a temperature variation of the refrigerant. Here, when the obtained temperature variation of the refrigerant at the outlet side of the compressor is greater than a preset minimum difference value (or reference temperature variation), the controller determines that the compressor normally operates, thereby turning the heater on (S122).

On the contrary, when the measured temperature variation of the refrigerant at the outlet side of the compressor is smaller than the preset reference temperature variation, there may be possibility that the compressor does not normally operate. Here, when the re-measured temperature of the refrigerant at the outlet side of the compressor is higher than a lower limit of a reference operating temperature, it may correspond to the normal operation of the compressor. Therefore, the controller may turn the heater on. On the other hand, when the re-measured temperature of the refrigerant at the outlet side of the compressor is lower than the lower limit of the reference operating temperature, it may correspond to an erroneous (abnormal) operation of the compressor.

When the measured temperature variation of the refrigerant at the outlet side of the compressor is smaller than the reference temperature variation, the controller may also first turn the heater on and then re-measure the temperature of the refrigerant at the outlet side of the compressor. Here, when the temperature variation of the refrigerant at the outlet side of the compressor after turning the heater on is greater than the preset reference temperature variation, it corresponds to the normal operation of the compressor, thereby performing the drying operation in the high-speed drying mode. Here, since the heater has already started, a separate control for turning the heater on is not necessary.

However, when the temperature variation of the refrigerant at the outlet side of the compressor after driving the heater is smaller than the preset reference temperature variation, the controller turns the heater off and forcibly converts the dryer into the normal drying mode, thereby performing the drying operation.

Figure 13:
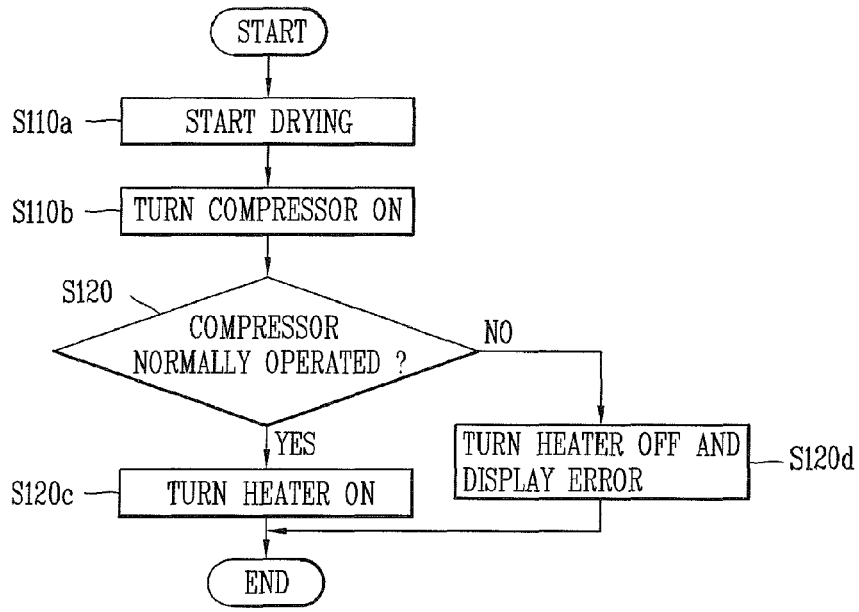
FIG. 13 is a flowchart showing another exemplary embodiment of a heater operation control according to whether or not the compressor of the heat pump system normally operates.

As another exemplary embodiment different from the aforementioned, FIG. 13 is a flowchart showing a process of initiating (starting, activating) a drying function by the controller in the dryer. As shown in FIG. 13, when needing to start a drying function, such as a user inputs a command to perform the drying function through the manipulation panel, the controller may start the drying function according to a preset procedure, such as rotating (running) the drum (S110a).

Afterwards, to supply hot air into the drum, a current is applied to the compressor to operate the compressor (S110b), and then it is determined whether the compressor normally operates after applying the current to the compressor (S120). If it is determined that the compressor is in a normal state, the heater is turned on (S120c) and the drying function is maintained. If not, the current applied to the compressor is blocked and a notification that an error occurs in the function of the dryer is sent to the user via a display unit or the like disposed on the manipulation panel (S120d).

As aforementioned, the dryer is the circulating type dryer in which the air exhausted from the drum is cooled and reheated to be resupplied into the drum. In the circulating type dryer, the evaporator is used to cool air by receiving heat energy contained in the exhausted air to remove moisture contained the air and transfer the received heat energy to the condenser to heat condensed air.

In the meantime, a refrigerant repetitively experiences a process in which the refrigerant transfers heat to air in the condenser, flows via the evaporator and is compressed in the compressor. When heat is not sufficiently transferred to the air in the condenser, heat is not sufficiently absorbed in the evaporator and accordingly moisture contained in the air is not sufficiently removed. Furthermore, a refrigerant of high temperature is introduced into the compressor, which may increase a load applied to the compressor. If the heat pump system does not normally operate due to an error occurred in the compressor, heat transfer may not be normally happened in the condenser. Under this state, when the heater is turned on, the temperature of air exhausted is further raised, which results in an increase in the temperature of the refrigerant supplied into the compressor, thereby further deteriorating the state of the compressor.

In other words, a maximum quantity of heat absorbable in the evaporator is set to be equivalent to a quantity of heat exhausted from the drum when the condenser and the heater simultaneously operate. However, when the compressor does not normally operates or right after the compressor is started, the quantity of heat absorbable in the evaporator may not come up to the maximum quantity of heat. When the compressor does not reach the normal state even if no error occurs therein, the quantity of heat absorbable in the evaporator increases according to the lapse of time, so the heater may be turned on. However, if an error has been generated, there may be much possibility of the absorbable quantity of heat not increasing even if a time elapses. In this case, the compressor should be turned off to be protected from damage caused due to an overload.

Therefore, in the exemplary embodiment, before turning the heater on after applying the current to the compressor, it may first be checked whether the compressor normally operates so as to address such problem.

Whether the compressor normally operates may be checked according to various methods. As one example, pressure of a refrigerant discharged from the compressor may be sensed by a pressure sensor or the like so as to directly check whether or not an error has been generated. In the exemplary embodiment, whether or not the compressor normally operates is determined based on the temperature of the refrigerant. Detailed steps thereof are shown in FIG. 14.

Figure 14:
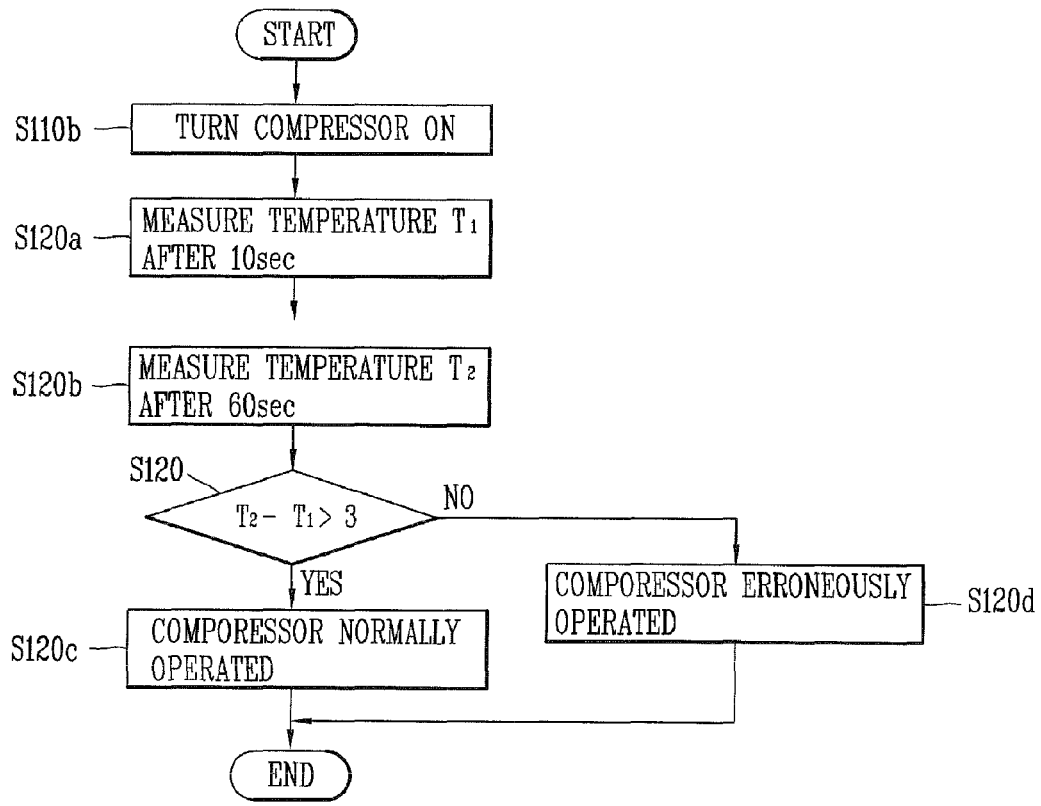
FIG. 14 is a flowchart showing a process of determining whether or not the compressor erroneously operates in the exemplary embodiment of FIG. 13.

As shown in FIG. 14, after applying a current to the compressor (S110b), a temperature T1 of the refrigerant is measured by the refrigerant temperature sensor after 10 seconds (S120a). The temperature T2 of the refrigerant is re-measured after 60 seconds from the measurement of T1 (S120b). When the difference between the measured temperatures T1 and T2 exceeds 3° C.(S120), it is determined that the compressor is normally started and approaching its normal state (S120c). If not, it is determined that an error has been generated in the compressor (S120d).

The exemplary embodiment shown in FIG. 13 may also be applied to a case where the operation of the compressor is performed for more than a predetermined time, as well as the beginning of running the compressor. That is, when the heater is needed to be turned on after a considerable time has elapsed since the compressor was started, the heater is turned on after checking whether or not the compressor normally operates. Accordingly, it may be checked whether or not heat generated in response to the heater being run is absorbable in the evaporator, thereby protecting the compressor.

For ensuring stability of the heat pump system even after normally turning the heater on, the controlling method for the dryer may further include a compressor temperature control step (S131) of controlling the temperature of the compressor. The compressor temperature control step (S131) may be performed to turn the heater on and off in a repetitive manner according to the temperature of the refrigerant having passed through the compressor.

In the hybrid dryer having the heat pump system, when an overload occurs in the compressor, it may result in lowering reliability of the compressor, and causing damage on a target to be dried due to an increase in inner temperature of the drum. Hence, the controller performs the compressor temperature control (S131) of controlling the temperature of the refrigerant passing through the compressor for preventing the overload of the compressor.

The exemplary embodiment of the compressor temperature control is characterized by repetitively turning on and off the heater or the cooling fan according to the temperature of the refrigerant having passed through the compressor. This is because a case of using both the heat pump system and the heater as the heat sources and a case of using only the heat pump system as the heat source are controlled in different ways.

Since the hybrid dryer has to continuously work the heat pump system, operation reliability of the compressor is important. Hence, for maintaining the reliability of the compressor, when the overload occurs in the compressor, the dryer may have a serious problem mechanically or during the drying operation. To address the problem, a valve control of protecting reliability of the compressor (S132) is needed.

The valve control may differ in the normal drying mode and the high-speed drying mode. Each drying mode uses a different heat source and exhibits different heat load, so the control by the controller may differ.

According to the valve control, to prevent an overload of the heat pump system, when a temperature of a refrigerant, which is measured while the heater is turned off, exceeds an upper limit of the temperature range or fails to reach a lower limit of the temperature range within a predetermined time, the controller may control an opening rate of the expansion valve disposed in the heat pump system.

A drum temperature control of controlling the temperature of the drum after the heater is turned on (S133) may further be performed. In the drum temperature control step (S133), the heater is turned on and off in a repetitive manner according to temperature of air supplied into the drum or temperature of air discharged from the drum, and when the number of turning the heater off reaches a predetermined reference number of times, only the heat pump system is used as the heat source to control the dryer to be converted into the normal drying mode.

In the meantime, when heat supply by the heat source is not needed because a target to be dried is dried up to an appropriate dryness, a cooling process of cooling the target to be dried such that the target to be dried can have humidity and temperature as appropriate as a user being able to immediately wear it by taking out of the dryer.

The operation of the heat sources is stopped during the cooling process. The stopping of the operation of the heat source may be performed sequentially by turning the heater off (S150) and turning the heat pump system off (S160).

The invention claimed is:

1. A controlling method for a dryer, wherein at least one of a heat pump system or a heater is selected as a heat source for heating air supplied in to a drum and a heat supply capacity of the heat pump system is more than a heat supply capacity of the heater, the method comprising:
   selecting both the heat pump system and the heater as the heat sources;
   turning the heat pump system on
   turning the heater on after the heat pump system is normally turned on;
   turning the heater off to cool the drum and terminate drying after the drying is performed;
   turning the heat pump system off after the heater is turned off; and
   running the drum by driving a drive motor, wherein the running of the drum is started after performing a reverse rotation and a forward rotation of the drive motor in a sequential manner, and wherein the turning on of the heat pump system is started after performing a forward rotation of the drive motor.

2. The method of claim 1, further including determining whether or not a compressor included in the heat pump system normally operates, wherein the turning on of the heater is performed after the normal, operation of the heat pump system is checked.

3. The method of claim 2, wherein the determining of whether or not the compressor normally operates is performed by comparing a temperature variation of a refrigerant having passed through the compressor with a preset reference temperature variation.

4. The method of claim 2, wherein the determining of whether or not the compressor normally operates includes:
   measuring a temperature of a refrigerant discharged from the compressor;
   measuring a temperature ot a refrigerant discharged from the compressor after a preset time elapses from the measurement of the temperature of the refrigerant discharged from the compressor; and
   determining whether or not the compressor normally operates according to a difference value between the temperature of the refrigerant discharged from the compressor and the temperature of the refrigerant discharged from the compressor after a preset time elapses from the measurement of the temperature of the refrigerant discharged from the compressor.

5. The method of claim 4, wherein it is determined that the compressor normally operates when the difference value between the temperature of the refrigerant discharged from the compressor and the temperature of the refrigerant discharged from the compressor after a preset time elapses from the measurement of the temperature of the refrigerant discharged from the compressor is more than a predetermined value.

6. The method of claim 4, further including turning the compressor off when the difference value between the temperature of the refrigerant discharged from the compressor and the temperature of the refrigerant discharged from the compressor after a preset time elapses from the measurement of the temperature of the refrigerant discharged from the compressor is lower than the predetermined value, and displaying an existence of error in the dryer.

7. The method of claim 2. the determining of whether or not the compressor normally operates is performed by measuring a discharge pressure of the compressor.

8. A controlling method for a dryer, wherein at least one of a heat pump system or a heater is selected as a heat source for heating air supplied in to a drum and a heat supply capacity of the heat pump system is more than a heat supply capacity of the heater, the method comprising:
   selecting both the heat pump system and the heater as the heat sources;
   turning the heat pump system on;
   turning the heater on after the heat pump system is normally turned on;
   turning the hearer off to cool the drum and terminate drying after the drying is performed;
   turning the heat pump system off after the heater is turned off; and
   determining whether or not a compressor included in the heat pump system normally operates, wherein the turning on of the heater is performed after the normal operation of the heat pump system is checked, wherein the determining of whether or not the compressor normally operates includes:
      measuring a temperature of a refrigerant discharged from the compressor;
      measuring a temperature of a refrigerant discharged from the compressor after a preset time elapses from the measurement of the temperature of the refrigerant discharged from the compressor; and
      determining whether or not the compressor normally operates according to a difference value between the temperature of the refrigerant discharged from the compressor and the temperature of the refrigerant discharged from the compressor after a preset time elapses from the measurement of the temperature of the refrigerant discharged from the compressor.

9. The method of claim 8, wherein it is determined that the compressor normally operates when the difference value between the temperature of the refrigerant discharged from the compressor and the temperature of the refrigerant discharged from the compressor after a preset time elapses from the measurement of the temperature of the refrigerant discharged from the compressor is more than a predetermined value.

10. The method of claim 8, further including turning the compressor off when the difference value between the temperature of the refrigerant discharged from the compressor and the temperature of the refrigerant discharged from the compressor after a preset time elapses from the measurement of the temperature of the refrigerant discharged from the compressor is lower than the predetermined value, and displaying an existence of error in the dryer.

* * * * *